May 17, 1960     A. M. VOELKL     2,936,641
VARIABLE SPEED TRANSMISSION
Filed July 5, 1956
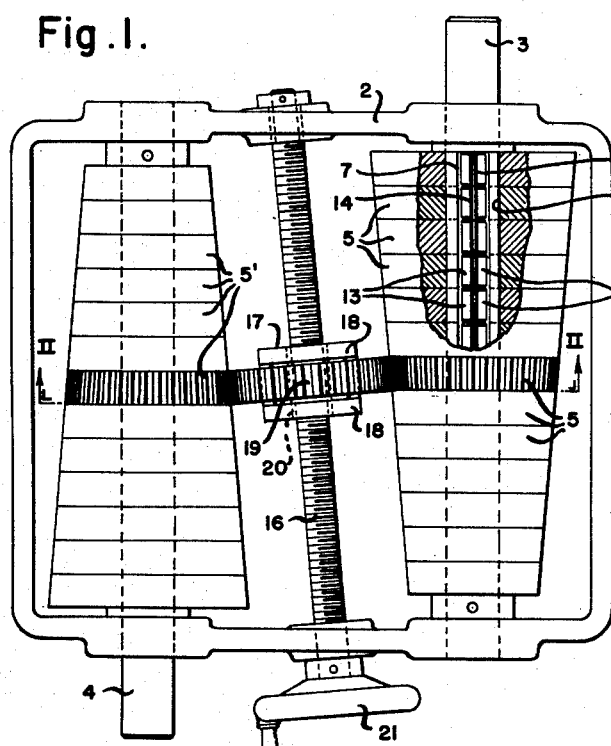
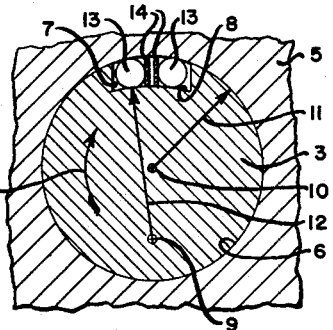
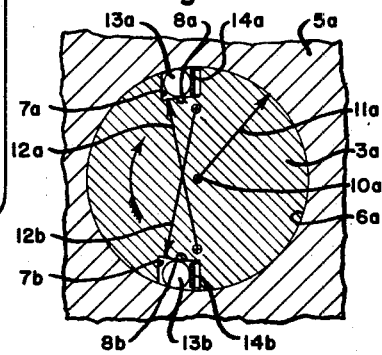
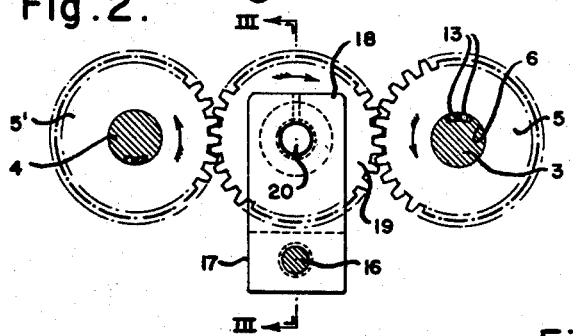
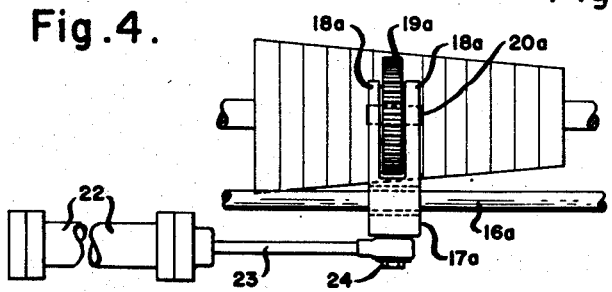
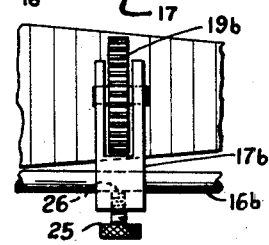
INVENTOR
Alfred M. Voelkl

United States Patent Office 2,936,641
Patented May 17, 1960

2,936,641

VARIABLE SPEED TRANSMISSION

Alfred M. Voelkl, Avalon, Pa.

Application July 5, 1956, Serial No. 595,935

20 Claims. (Cl. 74—349)

This invention relates to a variable speed transmission, particularly a variable speed transmission of the type employing a series of gears of different diameter but equal pitch mounted on a shaft and operatively connected with the shaft through clutching means together with power transmitting gear means movable generally along said series of gears and adapted to mesh therewith for transmitting power, the speed of the driven element of the transmission depending at least partially upon the diameter of the gear of said series of gears with which the power transmitting gear means is in mesh at any particular time. The speed of the driven element of the transmission relative to the speed of the driving element may be increased by employing a second series of gears of different diameter but equal pitch mounted on a shaft extending generally alongside the first mentioned shaft and operatively connected with the second mentioned shaft through clutching means with the gears of the respective series increasing in opposite directions and the power transmitting gear means in mesh with gears of the respective series.

Transmissions of the general type above referred to are not new. However in such transmissions as have heretofore been proposed the problem of transition from one speed to another has not been satisfactorily solved. The gears of the series of gears of different diameter but equal pitch have been operatively connected with their shafts by clutching means such as pawl and ratchet mechanisms. Clutching means such as pawl and ratchet mechanisms do not provide for smooth transition in speed as the power transmitting gear means moves along a series of gears of different diameter; the power flow is uneven and "jumpy."

A special difficulty is encountered when the transmission is made reversible. In that case each gear of a series of gears of different diameter must be operatively connected with the shaft by clutching means acting in opposite directions. If pawl and ratchet clutching means are employed in a reversible transmission the transmission will fail mechanically or stall when, for example, a shaft on which a series of gears of different diameter is mounted is driven by the power transmitting gear means while simultaneously in mesh with two gears of different diameter. One of those two gears must turn relatively to the other; but each is clutched to the shaft in each direction of rotation. When pawl and ratchet or similar positive action clutching means are used failure or stalling of the transmission can be forestalled only by the provision of special complicated and costly means for temporarily rendering inoperative one of the clutching means.

I have solved the above mentioned problems by provision of a new variable speed transmission providing for smooth uniform power flow as the speed of the transmission varies and obviating any mechanical failure or other difficulty in reversible transmissions without providing special means for temporarily rendering inoperative one of the clutching means.

I provide a variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein a recess, clutching means in the recess through which one of the gear and shaft is adapted to drive the other thereof in one direction but not in the opposite direction, another gear movable generally along said series of gears and adapted to mesh therewith and means operatively connected with the last mentioned gear to turn in consonance therewith. The bottom of the recess may converge in one direction toward said smooth continuous surface portion and the clutching means in the recess may be adapted to move along the bottom of the recess to wedge against said smooth continuous surface portion to operatively couple the gear and shaft in one direction of rotation but not in the opposite direction. I preferably provide a clutching roller in the recess adapted to roll along the bottom of the recess to wedge against said smooth continuous surface portion. Means may be and preferably are provided urging the clutching means toward operative coupling position.

While the recess means (one or more than one recess) may be in either the gears of the series of gears of different diameter or in the shaft on which the gears are mounted, I prefer to provide the gears with smooth continuous bores and the shaft with recess means therein in which the clutching means are disposed. The shaft preferably has a recess extending continuously along the shaft opposite the gears and a series of clutching rollers are preferably disposed in the recess, one within the bore of each of the gears. The means urging the rollers toward operative coupling position may be in the form of continuous leaf spring means within the recess and extending therealong.

I preferably provide a guideway disposed generally along the series of gears of different diameter but spaced therefrom and provide for movement of the power transmitting gear along the guideway. Such movement may be accomplished by various means such as piston and cylinder means. A screw shaft may be journaled for rotation and disposed generally along the series of gears of different diameter but spaced therefrom, and a carrier carrying the power transmitting gear may be threaded onto the screw shaft so that upon rotation of the screw shaft the carrier and hence the power transmitting gear travels therealong.

In a reversible variable speed transmission I provide a shaft, a series of gears of different diameter but equal pitch mounted on the shaft, one of (1) each of the gears and (2) the shaft having a smooth continuous surface portion opposing a surface portion of the other, the latter mentioned surface portion having therein recess means, two clutching members in the recess means through one of which one of the gear and shaft is adapted to drive the other thereof in one direction only and through the other of which one of the gear and shaft is adapted to drive the other thereof in the opposite direction only, another gear movable generally along said series of gears and adapted to mesh therewith and means operatively connected with the last mentioned gear to turn in consonance therewith. The clutching members are preferably in the form of rollers as mentioned above. The shaft may have two recesses therein spaced apart circumferentially of the shaft and each extending continuously along the shaft opposite the gears, the bottom of one recess converging in one direction toward the smooth continuous bores of the gears and the bottom of the other recess converging in the opposite direction toward the smooth continuous bores of the gears. A clutching roller may be provided in each recess within the bore of each of the gears through one of which clutching rollers the gear and shaft are adapted to be operatively coupled together in one direction of rotation only and through the other of which clutching rollers the gear and shaft are adapted to be operatively coupled together in the opposite direction of rotation only. The power transmitting gear is movable generally along the series of gears of different diameter and adapted to mesh therewith.

Alternatively the shaft may have a recess therein extending continuously along the shaft opposite the gears and the bottom of the recess in each transverse direction from its central portion may converge toward the smooth continuous bores of the gears, two clutching rollers being disposed in the recess within the bore of each of the gears and spring means being provided urging each clutching roller laterally away from the central portion of the recess so that through one of the clutching rollers the gear and shaft are adapted to be operatively coupled together in one direction of rotation only and through the other of the clutching rollers the gear and shaft are adapted to be operatively coupled together in the opposite direction of rotation only.

I further provide a variable speed transmission comprising a shaft, a series of gears of different diameter but equal pitch mounted on the shaft, another gear movable generally along said series of gears and adapted to mesh therewith, means operatively connected with the last mentioned gear to turn in consonance therewith and two overrunning clutches operatively interposed between the shaft and each of the gears of said series of gears and respectively operative upon rotation in opposite directions, each of the overrunning clutches being constructed and arranged to slip when said last mentioned gear is in mesh with more than one of the gears of said series of gears and the driving force is being transmitted through a gear other than the gear with which said overrunning clutch is connected and in the direction of rotation in which said overrunning clutch is operative. In such a transmission one of (1) each of the gears of said series of gears and (2) the shaft preferably has a smooth continuous surface portion opposing the other thereof, which other has two overrunning clutches associated with each gear of said series of gears coacting with said smooth continuous surface portion and respectively operative upon rotation in opposite directions, each of the overrunning clutches having a clutching element—preferably a roller—cooperable with said smooth continuous surface portion and slippable therealong when said last mentioned gear is in mesh with more than one of the gears of said series of gears and the driving force is being transmitted through a gear other than the gear with which said overrunning clutch is connected and in the direction of rotation in which said overrunning clutch is operative.

In a preferred form my variable speed transmission may comprise a driving shaft, a driven shaft disposed generally alongside the driving shaft, a series of gears of different diameter but equal pitch mounted on each shaft, the gears of the respective series increasing in diameter in opposite directions, one of (1) each of the gears and (2) the shaft on which such gear is mounted having a smooth continuous surface portion opposing a surface portion of the other, the latter mentioned surface portion having therein a recess, clutching means in the recess through which in the case of the driving shaft the shaft is adapted to drive the gear in one direction but not in the opposite direction and in the case of the driven shaft the gear is adapted to drive the shaft in one direction but not in the opposite direction and power transmitting gear means movable generally along the respective series of gears and adapted to mesh with the gears of the respective series.

Finally my variable speed transmission may comprise two shafts extending generally alongside each other, a series of gears of different diameter but equal pitch mounted on each shaft, the gears of the respective series increasing in diameter in opposite directions, power transmitting gear means movable generally along the respective series of gears and adapted to mesh with the gears of the respective series, two overrunning clutches operatively interposed between each gear and the shaft on which such gear is mounted and respectively operative upon rotation in opposite directions, each of the overrunning clutches being constructed and arranged to slip when the power transmitting gear means are in mesh with more than one of the gears of the series of gears which includes said last mentioned gear and the driving force is being transmitted through another gear of that series and in the direction of rotation in which said overrunning clutch is operative. The gears preferably have smooth continuous bores and the shaft preferably has recess means therein with clutching means disposed in the recess means in each shaft through which one of (1) each of the gears and (2) the shaft is adapted to drive the other thereof in one direction but not in the opposite direction. The clutching means are preferably constructed and arranged to slip when the power transmitting gear means are in mesh with more than one of the gears of the series of gears which includes the gear with which the clutching means coacts and the driving force is being transmitted through another gear of that series and in the direction of rotation in which said clutching means is operative.

Other details, objects and advantages of the invention will become apparent as the following description of certain present preferred embodiments thereof proceeds.

In the accompanying drawings I have shown certain present preferred embodiments of the invention in which Figure 1 is a face view, partly in cross section, of a variable speed transmission;

Figure 2 is a fragmentary cross sectional view taken on the line II—II of Figure 1;

Figure 3 is a fragmentary cross sectional view taken on the line III—III of Figure 2;

Figure 4 is a fragmentary elevational view showing a modified structure;

Figure 5 is a greatly enlarged cross sectional view through one of the shafts of the structure shown in Figure 1;

Figure 6 is a view similar to Figure 5 showing a modified structure; and

Figure 7 is a fragmentary view similar to a portion of Figure 4 showing a modified structure.

Referring now more particularly to the drawings, my variable speed transmission may take various forms and may be reversible or non-reversible. The structures shown in the drawings are reversible. There is shown diagrammatically a housing designated generally by reference numeral 2 in which are journaled shafts 3 and 4. In the reversible structure shown either of the shafts 3 and 4 may be the driving shaft and the other may be the driven shaft. The transmission is preferably identical on opposite sides of the axis of the screw shaft presently to be described so detailed description of one of the shafts 3 and 4 and the series of gears of different diameter but equal pitch mounted on the shaft and the clutching means therefor will suffice.

Mounted on the shaft 3 is a series of gears of different diameter but equal pitch. The gears are designated by reference numeral 5. In the transmission shown in the drawings thirteen gears 5 are shown but the number of such gears may be more or less as desired. From top to bottom viewing Figure 1 the gears 5 successively have fewer and fewer teeth and since the pitch is the same in all gears the diameter of the gears decreases progressively. Each gear may have one less tooth than the gear above it, or two less teeth, or three less teeth, etc., as may be deemed most desirable for the particular work at hand.

All of the gears 5 have smooth uniform bores 6 as shown in Figure 5. The shaft 3 has a recess 7 extending continuously along the shaft opposite the gears. The bottom of the recess 7 is designated by reference numeral 8 and is shown as being a curved surface with its center along the line 9 parallel to the axis 10 of the shaft 3. The radius of the shaft 3 is indicated by the arrow 11. The radius of the surface 8 is indicated by the arrow 12. The radius of the surface 8 forming the bottom of the recess is greater than the radius of the shaft so that the bottom of the recess in each transverse direction from its central portion converges toward the smooth continuous bores of the gears 5 as shown in Figure 5.

Disposed in the recess 7 within the bore of each of the gears 5 are two clutching elements 13 shown as being in the form of rollers. Each roller 13 has a length equal to the thickness of the gear 5 within the bore of which it is disposed; since the gears 5 are of equal thickness the rollers 13 are of equal length. In the form of structure shown in the drawings the recess 7 has its extremities in transverse alignment with the outer faces of the outer gears of the series of gears 5; thus the length of the recess 7 is exactly thirteen times the thickness of one of the gears 5 or thirteen times the length of one of the rollers 13. There are two longitudinal series of rollers with the rollers in each series substantially coaxial and abutting end to end. The rollers of the respective series are urged laterally away from the central portion of the recess 7 by spring means shown in the drawings as comprising a pair of leaf springs 14. The leaf springs 14 urge the rollers 13 toward operative position, i.e., toward positions in which they may be wedged between the outer portions of the bottom of the recess 7 and the smooth continuous bores of the gears 5, the wedging action of each roller 13 depending upon the meshing with the corresponding gear 5 of the power transmitting gear means presently to be described and the direction of rotation as will be explained. Each roller is of such diameter that it may become wedged between the bore of the gear in which it is disposed and the bottom of the recess 7 just before it would engage the outer wall of the recess, thus clutching together that gear and the shaft 3. Figure 5 is intended to indicate the left-hand roller 13 as being in operative or clutching position with the right-hand roller 13 as being in inoperative or non-clutching position. The left-hand roller 13 viewing Figure 5 is tightly wedged between the outer portion of the bottom of the recess 7 and the smooth continuous bore 6 of the gear 5. The shaft 3 is being driven in the direction of the arrow 15 of Figure 5. With the shaft driven in that direction the gear 5 is coupled or cluched to the shaft by the left-hand roller 13 viewing Figure 5, the right-hand roller 13 being at that time inoperative. If the shaft were driven in the opposite direction the gear 5 would be coupled to it by the right-hand roller 13. Thus in whichever direction the shaft 3 is driven the gears 5 may be coupled to the shaft by one or the other of the sets of rollers 13 which constitute in effect overrunning clutches.

As explained above, the structure of the shaft 4 and the gears mounted thereon, which are designated 5', is the same as above described with respect to the shaft 3 and the gears 5. In the structure shown the axes of the shafts 3 and 4 are parallel and the gear 5 or 5' of smallest diameter is approximately opposite the gear 5' or 5 of largest diameter. However such gears are slightly offset axially of the shafts as clearly shown in Figure 1 because of the angular arrangement of the power transmitting gear presently to be described. The face of each of the gears 5 and 5' is shown as being conical with the gears of each set when assembled together forming in general a cone as shown in Figure 1.

Journaled in the housing 2 is an elongated screw shaft 16 whose axis is substantially parallel to the elements of the cones formed by the gears 5 and 5' which are closest to each other as shown in Figure 1. Threaded onto the screw shaft 16 is a carrier 17 bifurcated its upper portion at 18 having disposed between the opposed parts of its upper portion a power transmitting gear 19 mounted to rotate upon a stub shaft 20. The power transmitting gear 19 is adapted to be in mesh at all times with at least one of the gears 5 and at least one of the gears 5'. A hand wheel 21 is connected with the screw shaft 16 outside the housing 2. When the hand wheel 21 is turned the screw shaft 16 turns therewith and due to the fact that the carrier 17 is threaded onto the screw shaft the carrier 17 carrying the power transmitting gear 19 moves axially of the screw shaft. In the form shown in the drawings the width of the power transmitting gear 19 is approximately the same as the width of the gears 5 and 5' but the width of the gear 19 may be either greater or less. Two or more meshing gears may be substituted for the gear 19 if desired.

As the power transmitting gear 19 is moved axially of the screw shaft 16 it passes successively into and out of engagement with the various gears 5 and 5' as is clear from examination of Figure 1. During most of the time while it is being moved axially of the screw shaft 16 the power transmitting gear 19 is in mesh with two gears 5 and with two gears 5'. On each of the shafts 3 and 4 the gear with the fewer teeth in mesh with the gear 19 will turn faster than the gear with the greater number of teeth in mesh with the gear 19. The shaft 3 will through the clutching effect of the left-hand roller 13 viewing Figure 5 drive the gear 5 having the greater number of teeth which is in mesh with the power transmitting gear 19 while the gear 5 having the fewer teeth which is in mesh with the power transmitting gear 19 at the same time will turn on the shaft 3 in the same direction of rotation as the shaft and at a speed greater than the speed of the shaft. Such turning will be permitted by slippage (possibly accompanied by rotation) of the right-hand roller 13 viewing Figure 5 which except for such slippage tends to prevent the gear from turning faster than the shaft. If the power transmitting gear 19 is permitted to remain in mesh with two gears 5 (and two gears 5') for a prolonged period of time the slippage will continue and the variable speed transmission will function smoothly.

As above described the power transmitting gear 19 is driven by a gear 5 and the power transmitting gear in turn drives a gear 5'. The gear 5' in turn drives the driven shaft 4. At times when the power transmitting gear 19 is in mesh with two gears 5' the gear with fewer teeth will turn faster and hence will drive the shaft 4. The gear with the greater number of teeth will turn more slowly and will in effect turn backwardly upon the shaft, such backward turning being permitted by slippage of one of the clutching rollers in the same manner as above described with respect to the shaft 3 and the gears 5.

Viewing Figure 1, when the power transmitting gear 19 is at the upper portion of the housing in mesh with the gear 5 of greatest diameter and the gear 5' of least diameter the speed of the driven shaft 4 will be maximum for a given speed of the driving shaft 3 and when the power transmitting gear 19 is at the lower portion of the housing in mesh with the gear 5 of least diameter and the gear 5' of greatest diameter the speed of the driven shaft 4 will be minimum for a given speed of the driving shaft 3. As the power transmitting gear 19 moves axially of the screw shaft 16 with the driving shaft 3 operating at constant speed the speed of the driven shaft 4 increases or decreases smoothly and uniformly. The clutching rollers function virtually instantaneously, eliminating the jerking due to delayed operation of pawl and ratchet clutching means. By reason of the type of clutching means employed slippage occurs of the non-driving clutching means in a reversible type transmission as above described.

Figure 6 shows a modified construction which is the operative equivalent of Figure 5. In Figure 6 the driving shaft 3a has mounted thereon a gear 5a having a smooth continuous bore 6a. The shaft 3a has two elongated recesses 7a and 7b. The bottoms 8a and 8b respectively of the recesses 7a and 7b are, as shown, formed upon radii 12a and 12b greater than the radius 11a of the shaft 3a whose axis is at 10a. The upper clutching roller 13a is urged toward the left viewing Figure 6 by a leaf spring 14a and the lower clutching roller 13b is urged to the left viewing Figure 6 by a leaf spring 14b. The structure of Figure 6 functions in exactly the same manner as that of Figure 5, the only difference being that in Figure 6 two recesses are provided for the clutching rollers whereas in Figure 5 only one recess is used.

Figure 4 shows a modified mechanism for moving the power transmitting gear along the series of gears of different diameter. In Figure 4 a smooth rod 16a forms a guideway for the carrier 17a bifurcated at its upper portion as shown at 18a. The power transmitting gear 19a is journaled on a stub shaft 20a carried by the carrier 17a. I provide a fluid pressure cylinder 22 in which operates a piston with which is connected a piston rod 23 connected at 24 with the carrier 17a. By proper control of the fluid in the cylinder 22 the carrier 17a and hence the power transmitting gear 19a may be moved as desired along the guideway 16a.

It is not necessary to provide mechanical means for moving the power transmitting gear along the guideway. Power transmitting gear means may be moved by hand by simply exerting pressure on the carrier carrying such gear means. Such gear means may be fastened in adjusted position by a set screw threaded through the carrier and acting against the guideway. For example, Figure 7 shows a modified mechanism in which a power transmitting gear 19b is carried by a bifurcated carrier 17b which is generally the same as the carrier 17a shown in Figure 4 and slidable along a smooth rod 16b. In the mechanism of Figure 7 the bifurcated carrier 17b carrying the power transmitting gear 19b is moved along the smooth rod 16b by hand and positioned in a selected position for operation. It is then fastened in place by tightening a set screw 25 the inner end 26 of which engages and bears against the smooth rod 16b.

While I have shown and described certain present preferred embodiments of the invention it is to be distinctly understood that the invention is not limited thereto but may be otherwise variously embodied within the scope of the following claims.

I claim:

1. A variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein a recess, clutching means in the recess through which one of the gear and shaft is adapted to drive the other thereof in one direction but not in the opposite direction, an elongated mounting member extending generally along said series of gears, another gear movable generally along said elongated mounting member and adapted to mesh with said series of gears, manually operable fastening means fixed in holding position for fastening said last mentioned gear in selected position along said elongated mounting member and means operatively connected with the last mentioned gear to turn in consonance therewith.

2. A variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein a recess, the bottom of the recess converging in one direction toward said smooth continuous surface portion, clutching means in the recess adapted to move along the bottom of the recess to wedge against said smooth continuous surface portion to operatively couple the gear and shaft in one direction of rotation but not in the opposite direction, an elongated mounting member extending generally along said series of gears, another gear movable generally along said elongated mounting member and adapted to mesh with said series of gears, set screw means for fastening said last mentioned gear in selected position along said elongated mounting member and means operatively connected with the last mentioned gear to turn in consonance therewith.

3. A variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein a recess, the bottom of the recess converging in one direction toward said smooth continuous surface portion, a clutching roller in the recess adapted to roll along the bottom of the recess to wedge against said smooth continuous surface portion to operatively couple the gear and shaft in one direction of rotation but not in the opposite direction, means urging the roller toward operative coupling position, another gear movable generally along said series of gears and adapted to mesh therewith and means meshing with the last mentioned gear to turn in consonance therewith.

4. A variable speed transmission comprising a shaft, a series of gears of different diameter but equal pitch mounted on the shaft, the gears having smooth continuous bores, the shaft having recess means therein, clutching means in the recess means in the shaft through which one of (1) each of the gears and (2) the shaft is adapted to drive the other thereof in one direction but not in the opposite direction, a screw extending generally along said series of gears, another gear mounted on said screw for movement along said screw upon turning of said screw and adapted to mesh with said series of gears and means operatively connected with the last mentioned gear to turn in consonance therewith.

5. A variable speed transmission comprising a shaft, a series of gears of different diameter but equal pitch mounted on the shaft, the gears having smooth continuous bores, the shaft having therein a recess extending continuously along the shaft opposite the gears, a series of clutching rollers in the recess, one within the bore of each of the gears, through which one of (1) each of the gears and (2) the shaft is adapted to drive the other thereof in one direction but not in the opposite direction, an elongated mounting member extending generally along said series of gears, another gear movable generally along said elongated mounting member and adapted to mesh with said series of gears, means including piston and cylinder means for moving said last mentioned gear along said elongated mounting member and means operatively connected with the last mentioned gear to turn in consonance therewith.

6. A variable speed transmission comprising a shaft, a series of gears of different diameter but equal pitch mounted on the shaft, the gears having smooth continuous bores, the shaft having therein a recess extending continuously along the shaft opposite the gears, the bottom of the recess converging in one direction toward the smooth continuous bores of the gears, a series of clutching rollers in the recess, one within the bore of each of the gears, adapted to roll along the bottom of the recess to wedge against the bores of the gears to operatively couple the respective gears and the shaft in one direction of rotation but not in the opposite direction, means urging the rollers toward operative coupling position, another gear movable generally along said series of gears and adapted to mesh therewith and means operatively connected with the last mentioned gear to turn in consonance therewith.

7. A variable speed transmission comprising a shaft, a series of gears of different diameter but equal pitch mounted on the shaft, the gears having smooth continuous bores, the shaft having therein a recess extending continuously along the shaft opposite the gears, the bottom of the recess converging in one direction toward the smooth continuous bores of the gears, a series of clutching rollers in the recess one within the bore of each of the gears, adapted to roll along the bottom of the recess to wedge against the bores of the gears to operatively couple the respective gears and the shaft in one direction of rotation but not in the opposite direction, a continuous leaf spring within the recess and extending therealong urging the rollers toward operative coupling position, another gear movable generally along said series of gears and adapted to mesh therewith and means operatively connected with the last mentioned gear to turn in consonance therewith.

8. A variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein a recess, clutching means in the recess through which one of the gear and shaft is adapted to drive the other thereof in one direction but not in the opposite direction, a guideway disposed generally along said series of gears but spaced therefrom, another gear movable along the guideway and adapted to mesh with said series of gears, means for moving the last mentioned gear along the guideway, manually operable fastening means fixed in holding position for fastening said last mentioned gear in selected position along said guideway and means operatively connected with the last mentioned gear to turn in consonance therewith.

9. A variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein a recess, clutching means in the recess through which one of the gear and shaft is adapted to drive the other thereof in one direction but not in the opposite direction, a guideway disposed generally along said series of gears but spaced therefrom, another gear movable along the guideway and adapted to mesh with said series of gears, piston and cylinder means for moving the last mentioned gear along the guideway and means operatively connected with the last mentioned gear to turn in consonance therewith.

10. A variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein a recess, clutching means in the recess through which one of the gear and shaft is adapted to drive the other thereof in one direction but not in the opposite direction, a screw shaft journaled for rotation and disposed generally along said series of gears but spaced therefrom, a carrier threaded onto the screw shaft so that upon rotation of the screw shaft the carrier travels therealong, another gear carried by the carrier and adapted to mesh with said series of gears and means operatively connected with the last mentioned gear to turn in consonance therewith.

11. A variable speed transmission comprising a shaft, a series of gears of different diameter but equal pitch mounted on the shaft, one of (1) each of the gears and (2) the shaft having a smooth continuous surface portion opposing a surface portion of the other, the latter mentioned surface portion having therein recess means, two clutching members in the recess means through one of which one of the gear and shaft is adapted to drive the other thereof in one direction only and through the other of which one of the gear and shaft is adapted to drive the other thereof in the opposite direction only, another gear movable generally along said series of gears and adapted to mesh therewith and means operatively connected with the last mentioned gear to turn in consonance therewith.

12. A variable speed transmission comprising a shaft, a series of gears of different diameter but equal pitch mounted on the shaft, the gears having smooth continuous bores, the shaft having recess means therein, two clutching rollers in the recess means within the bore of each of the gears through one of which clutching rollers the gear and shaft are adapted to be operatively coupled together in one direction of rotation only and through the other of which clutching rollers the gear and shaft are adapted to be operatively coupled together in the opposite direction of rotation only, another gear movable generally along said series of gears and adapted to mesh therewith and means operatively connected with the last mentioned gear to turn in consonance therewith.

13. A variable speed transmission comprising a shaft, a series of gears of different diameter but equal pitch mounted on the shaft, the gears having smooth continuous bores, the shaft having two recesses therein, the recesses being spaced apart circumferentially of the shaft and each thereof extending continuously along the shaft opposite the gears, the bottom of one recess converging in one direction toward the smooth continuous bores of the gears, the bottom of the other recess converging in the opposite direction toward the smooth continuous bores of the gears, a clutching roller in each recess within the bore of each of the gears through one of which clutching rollers the gear and shaft are adapted to be operatively coupled together in one direction of rotation only and through the other of which clutching rollers the gear and shaft are adapted to be operatively coupled together in the opposite direction of rotation only, another gear movable generally along said series of gears and adapted to mesh therewith and means operatively connected with the last mentioned gear to turn in consonance therewith.

14. A variable speed transmission comprising a shaft, a series of gears of different diameter but equal pitch mounted on the shaft, the gears having smooth continuous bores, the shaft having a recess therein extending continuously along the shaft opposite the gears, the bottom of the recess in each transverse direction from its central portion converging toward the smooth continuous bores of the gears, two clutching rollers in the recess within the bore of each of the gears and spring means urging each clutching roller laterally away from the central porton of the recess so that through one of the clutching rollers the gear and shaft are adapted to be operatively coupled together in one direction of rotation only and through the other of the clutching rollers the gear and shaft are adapted to be operatively coupled together in the opposite direction of rotation only, another gear movable generally along said series of gears and adapted to mesh therewith and means operatively connected with the last mentioned gear to turn in consonance therewith.

15. A variable speed transmission comprising a shaft, a series of gears of different diameter but equal pitch mounted on the shaft, another gear movable generally along said series of gears and adapted to mesh therewith, means operatively connected with the last mentioned gear to turn in consonance therewith and two overrunning clutches operatively interposed between the shaft and each of the gears of said series of gears and respectively operative upon rotation in opposite directions, each of the overrunning clutches being constructed and arranged to slip when said last mentioned gear is in mesh with more than one of the gears of said series of gears and the driving force is being transmitted through a gear other than the gear with which said overrunning clutch is connected and in the direction of rotation in which said overrunning clutch is operative.

16. A variable speed transmission comprising a shaft, a series of gears of different diameter but equal pitch mounted on the shaft, another gear movable generally along said series of gears and adapted to mesh therewith, means operatively connected with the last mentioned gear to turn in consonance therewith, one of (1) each of the gears of said series of gears and (2) the shaft having a smooth continuous surface portion opposing the other thereof, which other has two overrunning clutches associated with each gear of said series of gears coacting with said smooth continuous surface portion and respectively operative upon rotation in opposite directions, each of the overrunning clutches having a clutching element cooperable with said smooth continuous surface portion and slippable therealong when said last mentioned gear is in mesh with more than one of the gears of said series of gears and the driving force is being transmitted through a gear other than the gear with which said overrunning clutch is connected and in the direction of rotation in which said overrunning clutch is operative.

17. A variable speed transmission comprising a shaft, a series of gears of different diameter but equal pitch mounted on the shaft, another gear movable generally along said series of gears and adapted to mesh therewith, means operatively connected with the last mentioned gear to turn in consonance therewith, one of (1) each of the gears of said series of gears and (2) the shaft having a smooth continuous surface portion opposing the other thereof, which other has two overrunning clutches associated with each gear of said series of gears coacting with said smooth continuous surface portion and respectively operative upon rotation in opposite directions, each of the overrunning clutches having a clutching roller acting against said smooth continuous surface portion and slippable therealong when said last mentioned gear is in mesh with more than one of the gears of said series of gears and the driving force is being transmitted through a gear other than the gear with which said overrunning clutch is connected and in the direction of rotation in which said overrunning clutch is operative.

18. A variable speed transmission comprising a driving shaft, a driven shaft disposed generally alongside the driving shaft, a series of gears of different diameter but equal pitch mounted on each shaft, the gears of the respective series increasing in diameter in opposite directions, one of (1) each of the gears and (2) the shaft on which such gear is mounted having a smooth continuous surface portion opposing a surface portion of the other, the latter mentioned surface portion having therein a recess, clutching means in the recess through which in the case of the driving shaft the shaft is adapted to drive the gear in one direction but not in the opposite direction and in the case of the driven shaft the gear is adapted to drive the shaft in one direction but not in the opposite direction and power transmitting gear means movable generally along the respective series of gears and adapted to mesh with the gears of the respective series.

19. A variable speed transmission comprising two shafts extending generally alongside each other, a series of gears of different diameter but equal pitch mounted on each shaft, the gears of the respective series increasing in diameter in opposite directions, power transmitting gear means movable generally along the respective series of gears and adapted to mesh with the gears of the respective series, two overrunning clutches operatively interposed between each gear and the shaft on which such gear is mounted and respectively operative upon rotation in opposite directions, each of the overrunning clutches being constructed and arranged to slip when the power transmitting gear means are in mesh with more than one of the gears of the series of gears which includes said last mentioned gear and the driving force is being transmitted through another gear of that series and in the direction of rotation in which said overrunning clutch is operative.

20. A variable speed transmission comprising two shafts extending generally alongside each other, a series of gears of different diameter but equal pitch mounted on each shaft, the gears of the respective series increasing in diameter in opposite directions, power transmitting gear means movable generally along the respective series of gears and adapted to mesh with the gears of the respective series, the gears having smooth continuous bores, the shaft having recess means therein, clutching means in the recess means in each shaft through which one of (1) each of the gears and (2) the shaft is adapted to drive the other thereof in one direction but not in the opposite direction, the clutching means being constructed and arranged to slip when the power transmitting gear means are in mesh with more than one of the gears of the series of gears which includes the gear with which the clutching means coacts and the driving force is being transmitted through another gear of that series and in the direction of rotation in which said clutching means is operative.

References Cited in the file of this patent
UNITED STATES PATENTS

| 647,465 | Belt | Apr. 17, 1900 |
| 897,846 | Olds | Sept. 1, 1908 |
| 1,111,551 | Adams | Sept. 22, 1914 |
| 1,169,618 | Compton | Jan. 25, 1916 |
| 1,473,634 | Loudon | Nov. 13, 1923 |
| 1,555,939 | Brisbois | Oct. 6, 1925 |

FOREIGN PATENTS

| 638,600 | France | Feb. 21, 1928 |